United States Patent [19]

Hart et al.

[11] Patent Number: 4,767,553

[45] Date of Patent: Aug. 30, 1988

[54] LUBRICATING OIL CONTAINING DISPERSANT VISCOSITY INDEX IMPROVER

[75] Inventors: William P. Hart, Freehold, N.J.; Maria M. Kapuscinski, Carmel; Christopher S. Liu, Poughkeepsie, both of N.Y.

[73] Assignee: Texaco Inc., White Plains, N.Y.

[21] Appl. No.: 945,982

[22] Filed: Dec. 24, 1986

[51] Int. Cl.$^4$ .......................................... C10M 145/14
[52] U.S. Cl. ................... 252/47.5; 252/48.6; 252/48.2; 252/51.5 R; 252/51.5 A; 524/549
[58] Field of Search .................... 252/47.5; 524/549

[56] References Cited

U.S. PATENT DOCUMENTS

| | | | |
|---|---|---|---|
| 3,467,668 | 9/1969 | Gruber et al. | 252/47.5 |
| 4,140,643 | 2/1979 | Davis | 252/47.5 |
| 4,170,561 | 9/1979 | Chapelet et al. | 252/47.5 |
| 4,200,559 | 4/1980 | Peterleen et al. | 524/549 |
| 4,221,886 | 9/1980 | Töpfi | 524/549 |
| 4,359,325 | 11/1982 | Dawson et al. | 524/549 |
| 4,381,367 | 4/1983 | von Bonin et al. | 524/549 |
| 4,517,104 | 5/1985 | Bloch et al. | 252/47.5 |
| 4,629,754 | 12/1981 | Syrier et al. | 524/549 |

FOREIGN PATENT DOCUMENTS 34807   3/1987   Japan .................................. 252/47.5

Primary Examiner—John C. Bleutge
Assistant Examiner—David W. Woodard
Attorney, Agent, or Firm—Robert A. Kulason; James J. O'Loughlin; Vincent A. Mallare

[57] ABSTRACT

Lubricating oils of improved properties contain a terpolymer of maleic anhydride, lauryl methacrylate, and stearyl methacrylate which has been functionalized or coupled with phenothiazine and with N-methyl piperazine.

8 Claims, No Drawings

LUBRICATING OIL CONTAINING DISPERSANT VISCOSITY INDEX IMPROVER

FIELD OF THE INVENTION

This invention relates to lubricating oils. More particularly, it relates to lubricating compositions characterized by improved properties of antioxidation, dispersancy and viscosity index.

BACKGROUND OF THE INVENTION

As is well known to those skilled in the art, it is possible to improve the properties of a lubricating oil by addition of various components. The viscosity index may be improved, as well as the dispersancy and antioxidant activity. Continued efforts are being made to attain improvement in these and other properties, and to attain these improvements at reduced cost.

Thus, it is an object of this invention to provide an improved lubricating composition. Other objects will be apparent to those skilled in the art.

STATEMENT OF THE INVENTION

This invention is directed to a method of preparing a functionalized polymer which comprises copolymerizing, under free radical polymerization conditions, (i) a first monomer containing a copolymerizable ethylenically unsaturated carbon-carbon double bond and a dicarboxylic acid anhydride moiety and (ii) second monomer containing a copolymerizable ethylenically unsaturated carbon-carbon double bond and which is free of anhydride moieties thereby forming a copolymer a of molecular weight $\overline{M}_n$ of 10,000–1,000,000 containing at least two pendant side chains containing epoxide moieties;

functionalizing a first portion of the side chains containing dicarboxylic acid anhydride moieties with first functionalizing agent containing at least one sulfur atom and at least one hetero nitrogen atom; functionalizing a second portion of the side chains containing dicarboxylic acid anhydride moieties with, as a second functionalizing agent, a primary or secondary functionalizing polyamine thereby forming a dually functionalized product polymer; and recovering the dually functionalized product polymer.

THE FIRST MONOMER

The first monomer which may be employed in the practice of the process of this invention contains an ethylenic unsaturation and dicarboxylic acid anhydride moiety.

Preferably the first monomer may be an unsaturated acid anhydride such as maleic anhydride characterized by the formula:

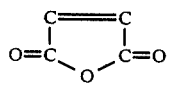

The first monomer which may be employed may be a
(1) citraconic anhydride, or an
(2) itaconic anhydride.

THE SECOND MONOMER

The second monomer which may be employed in the practice of the process of this invention may contain ethylenic unsaturation in a carbon-to-carbon double bond and be free of dicarboxylic acid anhydride moieties. These monomers may be characterized by the formula C=CA wherein A may be hydrogen or a pendant halide, carboxyl, hydrocarbon (typified by alkyl, alkaryl, aralkyl, cycloalkyl, aryl, etc.), —COOR', etc. The carbon atoms of C=CA may bear inert substituents as is the case for example with methacrylates (wherein the inert substituent is —CH₃). Typically, the second monomer may be a vinyl halide such as vinyl chloride, a vinyl carboxylate such as vinyl acetate or a styrene such as a para-vinyl benzoate.

Preferably the second monomer may be an acrylate having the formula

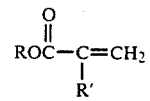

In the above formula, R may be a hydrocarbon selected from the group consisting of alkyl, aralkyl, cycloalkyl, aryl, and alkaryl including such radicals when inertly substituted. When R is an alkyl, it may typically be methyl, ethyl, n-propyl, i-propyl, n-butyl, i-butyl, sec-butyl, amyl, octyl, decyl or octadecyl. When R is an aralkyl, it may typically be benzyl or beta-phenylethyl. When R is a cycloalkyl, it may typically be cycloahexyl, cycloheptyl, cyclooctyl, 2-methylcycloheptyl, 3-butylcyclohexyl or 3-methylcyclohexyl. When R is an aryl, it may typically be phenyl or naphthyl. When R is an alkaryl, it may typically be tolyl or xylyl. R may be inertly substituted, i.e., it may bear a non-reactive substituent such as alkyl, an aryl, a cycloalkyl or an ether. Typically, inertly substituted R groups may include 2-ethoxyethyl, carboethoxymethyl, 4-methyl cyclohexyl, p-methylphenyl, p-methylbenzyl or 3-methyl-5-methylphenyl. The preferred R groups may be an alkyl, i.e., a $C_{12}$–$C_{20}$ stearyl group, and preferably a lauryl group.

R' may be as noted above. Preferably R' is hydrogen or more preferably is methyl.

When R' is hydrogen or methyl, it is apparent that the compositions may be acrylates or methacrylates.

Typical acrylates and methacrylates may include those listed below in Table 1.

TABLE 1

| | |
|---|---|
| methyl | acrylate |
| methyl | methacrylate |
| ethyl | acrylate |
| propyl | acrylate |
| butyl | methacrylate |
| octyl | acrylate |
| lauryl | acrylate |
| lauryl | methacrylate |
| decyl | acrylate |
| myristyl | acrylate |
| myristyl | methacrylate |
| cetyl | acrylate |
| cetyl | methacrylate |
| stearyl | acrylate |
| stearyl | methacrylate |
| eicosyl | acrylate, etc. |

The preferred second monomer may be lauryl methacrylate.

It is a feature of this invention that the copolymer may be formed from more than one first monomer and/or more than one second monomer. For example, it may be possible to form copolymer from (i) maleic anhydride as first monomer and (ii) citraconic anhydride as auxiliary first monomer. It may also be possible to utilize for example (iii) lauryl methacrylate as second monomer and (iv) stearyl methacrylate as auxiliary second monomer.

In one preferred embodiment, the polymer may be formed from (i) maleic anhydride as first monomer, (ii) stearyl methacrylate as second monomer, and (iii) lauryl methacrylate as auxiliary second monomer.

When two second monomers are employed, they may for example be both acrylates or both methacrylates. In the preferred embodiment, they may both be methacrylates wherein the alcohol-derived portions of the esters may be characterized as higher and lower moieties in the higher and lower second and auxiliary second monomers.

The preferred higher second monomer may be stearyl ($C_{18}$) methacrylate. The preferred lower second monomer may be lauryl ($C_{12}$) methacrylate.

The monomers may be employed in pure form or in commercially available form. One typical commercially available stearyl methacrylate for example contains the components shown below in Table 2.

TABLE 2

| Component | W % |
|---|---|
| Stearyl ($C_{18}$) | 52-64 |
| Cetyl ($C_{16}$) | 30-44 |
| Less than $C_{16}$ | remainder |

It is a feature of the process of this invention that the lower second monomer contain at least about two and preferably 2-6 carbons (in the alcohol moiety) than does the higher second monomer. The carbon number (i.e. the number of carbon atoms in the alcohol-derived portion of the ester) of the higher acrylate ester is at least about 2, and typically 2-6 more than the carbon number of the alcohol-derived moiety of the lower acrylate ester. For example if the lower pure monomer contains 10 carbon atoms (decyl), then the higher pure monomer may for example contain 12 or more carbon atoms. If the first pure monomer is myristyl ($C_{14}$), then the second pure monomer may for example be cetyl ($C_{16}$). It will be noted that "even-numbered moieties" are designated and preferred because of their commercial availability. When available, the esters derived from alcohols containing an odd number of carbon atoms may be employed.

When the esters employed are commercially available esters containing several homologues, then the carbon number to be employed in determining the alcohols which may be employed is the weight average carbon number, as determined for example by quantitative gas chromatographic analysis.

The preferred product polymers may be those which use as second and as auxiliary second monomers, those obtained from (i) commercially available lauryl methacrylate and (ii) commercially available stearyl methacrylate.

It is preferred to produce the desired product by copolymerization.

PREPARATION OF COPOLYMER

Copolymerization is typically effected by adding first monomer(s) and second monomer(s) to a reaction operation in mole ratio of 1:2-1:12, preferably 1:4-1:8, say about 1:6. There is preferably also added to the reaction operation polymerization-solvent in amount of 25-75 parts, say 47 parts per 100 parts of total reactants. Typical solvent may include hydrocarbons such as toluene, xylene, gas oil, lubricating oil cuts, etc. A preferred solvent may be the lubricating oil in which the product is to be used. Preferred may be a solvent neutral oil typified by 145 P Pale Turbine Oil.

There is added to the reaction mixture 0.018-0.35 parts, say 0.05 parts of $C_1$-$C_{20}$ alkyl mercaptan which serves as chain transfer agent (polymer chain length modifier). There is also added to the reaction mixture 0.05-0.15 parts, say 0.05 parts of dicumyl peroxide, dibenzoyl peroxide, or azobisisobutyronitrile which serves as polymerization initiator.

The reaction system may be purged with inert gas such as nitrogen and heated to 40° C.-150° C., preferably 40° C.-100° C., say 83° C. for 1-10 hours, preferably 1-6 hours, say 2.5 hours. Typically heating is continued until two consecutive identical refractive indices are obtained. Then additional azobisisobutyronitrile and solvent may be added. The temperature may be raised to 60° C.-160° C., preferably 80° C.-120° C., say 100° C. and maintained at that level for 10-120 minutes, say 60 minutes.

The product copolymer typically contains the same molar proportions as are present in the reaction mixture i.e. it contains moieties derived from the first reactant in amount of about 8 to about 35 mole %, preferably about 10 to about 20 mole %, say 15 mole % and moieties derived from the second reactant in an amount of about 65 to about 92 mole %, preferably about 80 to about 90 mole %, say 85 mole %. This corresponds to a mole ratio of about 1:2-12, preferably of about 1:4-8, say about 1:6.

In the preferred embodiment in which the first monomer is maleic anhydride and the second monomer is stearyl methacrylate and lauryl methacrylate, the final polymer may contain about 2 to about 15 mole %, say about 8 mole % derived from maleic anhydride, about 60 to about 70 mole %, say 65 mole % derived from lauryl methacrylate and about 15 to about 38 mole %, say about 27 mole % derived from stearyl methacrylate.

The preferred molecular weight $\overline{M}_n$ of the copolymer may range from about 10,000 to about 1,000,000, preferably from about 20,000 to about 180,000, more preferably from about 60,000 to about 100,000, say about 98,000, corresponding to a $\overline{M}_w$ of about 38,000 to about 450,000, preferably from about 200,000 to about 250,000, say about 213,000. Control of the molecular weights to within this desired range is obtained by use of chain transfer agents such as $C_1$-$C_{20}$ alkyl (eg lauryl) mercaptans and by control of the ratio of monomer to initiator.

The product polymer is typically obtained as a 25-80 wt.%, preferably 30-70 wt.%, say 50 wt.% solution in the solvent. It may be recovered and used as is or preferably it may be formulated into a concentrate containing polymer.

Typical polymers which may be utilized in practice of the process of this invention may include the following listed below in Table 3.

TABLE 3

| A. | 8 mole % maleic anhydride |
|---|---|
|  | 64 mole % lauryl methacrylate |
|  | 28 mole % stearyl methacrylate |
| B. | 4 mole % maleic anhydride |
|  | 70 mole % lauryl methacrylate |
|  | 26 mole % stearyl methacrylate |

TABLE 3-continued

| | |
|---|---|
| C. | 4 mole % citraconic anhydride |
| | 70 mole % decyl acrylate |
| | 26 mole % stearyl methacrylate |
| D. | 8 mole % itaconic anhydride |
| | 65 mole % lauryl acrylate |
| | 27 mole % stearyl methacrylate |

It is a feature of the polymers of this invention as so prepared that they are characterized by their ability to be utilized as pour depressants in hydrocarbon systems typified by lubricating oils.

When used as a pour depressant, the polymer may be present in the system in pour depressant amount. This may typically be 0.05–0.3 parts, preferably 0.7–0.25 parts, say 0.1 parts per 100 parts of eg. lubricating oil. By the use of quantities of this magnitude it is possible to convert an oil having a pour point of minus 5° F. to 20° F., say 10° F. (as measured by ASTM D- 97) to a product having a pour point of minus 10° F.–minus 25° F., say minus 20° F.

COUPLING REACTIONS

The polymer containing dicarboxylic acid anhydride moieties may be subjected to a coupling reaction in which a portion of the side chains containing anhydride moieties is coupled with a first functionalizing agent (antioxidant) which contains at least one sulfur atom and at least one hetero nitrogen atom and a second functionalizing agent (dispersant amine).

It is a feature of the process of this invention that there may be coupled onto these oil-soluble, substantially linear, carbon-carbon, backbone polymers, units derived from a first functionalizing agent which contains at least one sulfur atom and at one hetero nitrogen atom to provide anti-oxidant properties in the product polymer.

It is believed that best anti-oxidant activity in the desired polymer product is attained by coupling heterocyclic compounds which exhibit anti-oxidant activity when present in unbonded form. Preferred of these latter is phenothiazine.

The first functionalizing agent which may be employed may be monocyclic or polycyclic; and the nitrogen and sulfur may be contained in the same or a different ring. In the preferred embodiment, the functionalizing agent may be polycyclic and the nitrogen and sulfur may be in the same heterocyclic ring. The sulfur may be a hetero atom as is the case with phenothiazine or it may be pendant on a hetero-nitrogen ring as in a mercaptoimidazole.

The first functionalizing agent can be a heterocyclic-/aromatic or heterocyclic compound containing sulfur and hetero-nitrogen. The compounds which may be used as the first functionalizing agent include:

(1) phenothiazine and ring or/and N-substituted phenothiazine. Substituents may include hydrocarbon radicals selected from the group consisting of alkyl, alkenyl, cycloalkyl, aryl, alkaryl, or heterocyclic, including such radicals when containing oxygen, nitrogen, sulfur, halide or combinations thereof.

Typically, the ring-substituted phenothiazine may include alkyl or alkenyl phenothiazines, alkoxy phenothiazines, hydroxy alkyl phenothiazines, aminophenothiazines, nitrophenothiazines, 3-formyl-10-alkyl-phenothiazine, or 2-amino-4-(2-phenthiazinyl) thiazole.

(2) mercapto-imidazoles or mercaptobenzimidazoles, such as 2-mercaptobenzimidazole, 2-mercaptotoluimidazole or 2-mercapto-1-ethyl imidazole or 2-mercaptoimidazole.

(3) 2-mercapto-4-phenylthiazole or 2-mercaptobenzothiazole.

(4) mercapto-triazoles and mercaptobenzotriazoles, such as 3-mercapto-1H-1,2,4-triazole or 3-amino-5-methylthio-1H-1,2,4-triazole.

(5) 2-mercapto-thiazoline.

(6) mercaptopyrimidine, including 2-mercaptopyrimidine.

(7) mercaptopyridines, such as 2-mercapto pyridine, 4-mercapto-pyridine or 2-mercaptopyridine-N-oxide.

(8) mercaptooxazoles and mercaptobenzoxazoles, such as 2-mercaptobenzoxazole.

(9) mercaptoaniline, thiomorpholine, 6-mercaptopurine and 2-thiophene-ethyl amine.

Preferred of the functionalizing agents is phenothiazine which is a three-ring compound containing the nitrogen and sulfur in the same ring.

In practice of the process of this invention, 100 parts of charge polymer containing anhydride groups may be added to 100–1000 parts, say 300 parts of diluent-solvent. Typical diluent-solvent may be a hydrocarbon solvent such as mineral oil, n-hexane, n-heptane, or tetrahydrofuran. Preferred solvent may be a commercial mineral oil. Reaction mixture may then be heated to reaction conditions of 60° C.–180° C., preferably 150° C.–170° C., say 155° C.

First functionalizing agent, typically phenothiazine, is admitted in amount of 1–40 parts, say 5 parts, as a solution in 2–20 parts, say 8 parts of diluent-solvent typically synthetic diester base stock oil. Phenothiazine may be added alternatively as a powder or as a slurry in oil or other solvent used as reaction medium.

It is a feature of this invention that the first functionalizing agent may impart activity both as a pour-point depressant viscosity index improver and an antioxidant when the product is present in anti-oxidant amounts of 1–20 parts, say 5 parts per 100 parts of eg. a lubricating oil.

The polymer containing dicarboxylic acid anhydride moieties is coupled preferably in the polymerization solvent in which it was prepared with a second functionalizing agent such as heterocyclic or aliphatic amine.

The amines may typically be characterized by the formula

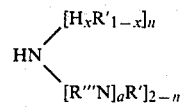

In this formula, a may be a number 1–20, preferably 1–10, say 5; x is 0 or 1; and n may be 0 or 1.

In the above compound, R' may be hydrogen or a hydrocarbon group selected from the group consisting of alkyl, aralkyl, cycloalkyl, aryl, and alkaryl, including such radicals when inertly substituted. When R' is alkyl, it may typically be methyl, ethyl, n-propyl, i-propyl, n-butyl, i-butyl, s-butyl, amyl, octyl, decyl, octadecyl, etc. When R' is a aralkyl, it may typically be benzyl, beta-phenylethyl, etc. When R' is cycloalkyl, it may typically be cyclohexyl, cycloheptyl, cyclooctyl, 2-methylcycloheptyl, 3-butylcyclohexyl, 3-methylcyclohexyl, etc. When R' is aryl, it may typically be phenyl, naphthyl, etc. When R' is alkaryl, it may typically be tolyl, xylyl, etc. R' may be inertly substituted i.e. it may bear a non-reactive substituent such as alkyl, aryl, cycloalkyl, ether, etc. Typically inertly substituted R' groups may include 2-ethoxyethyl, carboethoxymethyl, 4-methyl cyclohexyl, etc. The preferred R' groups may be hydrogen or lower alkyl, i.e. $C_1-C_{10}$ alkyl, groups including eg methyl, ethyl, n-propyl, i-propyl, butyls, amyls, hexyls, octyls, decyls, etc. R' may preferably be hydrogen.

R''' may be a hydrocarbon selected from the same group as R' subject to the proviso that R'' is divalent and contains one less hydrogen atom. R''' may be alkylene, alkarylene, aralkylene, cycloalkylene, or arylene. In an alternative embodiment, R'' may, together with the nitrogen atoms, form a cycloaliphatic or an aromatic ring.

Typical polyamines which may be employed may include:

1. Primary or secondary aliphatic amines, selected from the group consisting of amines containing 2 to 20 nitrogens, preferably 2 to 10 nitrogens, say 3 nitrogens, and molecular weight ranking between 60 to 100, preferably 100 to 400. Typical amines which may be employed may include:
3- dimethylaminopropylamine
N,N-diethyl-1,3-propanediamine
N-(-3-aminopropyl-tetramethyliminobis-)propylamine
N,N-propyl-1,3-propanediamine
N,N-Di-n-propyl-1,3-propanediamine
N,N-propylethylenediamine 2. Primary and secondary heterocyclic amines selected from the group consisting of piperazine and its derivatives such as:
N-methylpiperazine
N-aminoethylpiperazine
N-hydroxyethylpiperazine 3. Primary or secondary heterocyclic amines selected from the group consisting morpholine and its derivatives such as:
morpholine
N-aminopropylmorpholine
2,6-dimethylmorpholine 4. Primary or secondary heterocyclic amines such as:
1-(-3-aminopropyl)-2-pipecoline
1-(-3-aminopropyl)-2-pyrrolidinone
aminopyrazine
3-aminopyrazole
aminopyridines
2-aminopyrimidine
4-aminopyrimidine
aminoquinolines
aminotetrazoles It is preferred that the amine be a N-methylpiperazine or 3(N,N-dimethylamino)propylamine.

In practice of the process of this invention, 100 parts of charge polymer containing anhydride groups may be added to 100–1000 parts, say 300 parts of diluent-solvent. Typical diluent-solvent may be a hydrocarbon solvent such as mineral oil, n-hexane, n-heptane, or tetrahydrofuran. Preferred solvent may be a commercial mineral oil. Reaction mixture may then be heated to reaction conditions of 60° C.–180° C., preferably 150° C.–170° C., say 155° C.

Second functionalizing agent, typically N-methylpiperazine is admitted in the amount of 1–40 parts, say 5 parts to the reactor.

It is a feature of this invention that the second functionalizing agent may impart activity such as a pour-point depressant, viscosity index improver and a dispersant when the product is present in amounts of 1–20 parts, say 5 parts per 100 parts of a lubricating oil.

It is a feature of the process of this invention that it is preferable to effect functionalization with the first functionalizing agent and the second functionalizing agent simultaneously.

In practice of the process of this invention, 100 parts of charge polymer bearing anhydride units may be added to 100–1000 parts, say 300 parts of diluent-solvent. Typical diluent-solvent may be a hydrocarbon solvent such as n-hexane, n-heptane, tetrahydrofuran, or mineral oil. Preferred solvent may be a commercial mineral oil of low sulfur content and high content of saturated hydrocarbons. Reaction mixture may then be heated to reaction conditions of 60° C.–180° C., preferably 150° C.–170° C., say 155° C.

Preferably first functionalizing agent, typically phenothiazine, in amount of 1–20 parts, say 4 parts may be mixed with 0.5–20 parts, say 2 parts of second functionalizing agent, typically N-methyl piperazine, and the mixture may be admitted to the reaction system.

Reaction is typically carried out at 60° C.–180° C., say 155° C. for 0.5–20 hours, preferably 2–10 hours, say 5 hours during which time coupling of functionalizing agent with anhydride moeties containing polymer.

Typically the product may by contain 0.1–60, say 3 units derived from first functionalizing agent and 0.1–60, say 3 units derived from second functionalizing agent per 1000 carbon atoms of the charge backbone polymer.

Typical dually functionalized product polymers which may be used in practice of the process of this invention may include units derived from those listed below in Table 4.

TABLE 4

| | |
|---|---|
| E. | 8 mole % maleic anhydride |
| | 60 mole % lauryl methacrylate |
| | 24 mole % stearyl methacrylate |
| | 4 mole % phenothiazine |
| | 4 mole % N—methyl piperazine |
| F. | 6 mole % maleic anhydride |
| | 66 mole % lauryl methacrylate |
| | 22 mole % stearyl methacrylate |
| | 3 mole % phenothiazine |
| | 3 mole % N—methyl piperazine |
| G. | 4 mole % citraconic anhydride |
| | 68 mole % decyl acrylate |
| | 24 mole % myristyl methacrylate |
| | 2 mole % penothiazine |
| | 2 mole % 3(N,N—dimethylamino)propylamine |

It is a feature of this invention that the so-prepared polymer may find use in lubricating oils as multifunctional additive (e.g. viscosity index improvers which provide pour depressant, dispersant, and anti-oxidant properties, etc) when present in effective amount of 0.2–20.0 wt.%, preferably 2.0–10.0 wt.%, say 5.0 wt.%.

Lubricating oils in which the multifunctional additives of this invention may find use may include automotive, aircraft, marine, railway, etc. oils; oils used in spark ignition or compression ignition; summer or winter oils; etc. Typically the lubricating oils may be characterized by an ibp of 570° F.–660° F., say 610° F.; an ep of 750° F.–1200° F., say 1020° F.; and an API gravity of 25–31, say 29.

A typical lubricating oil in which the polymer of this invention may be present may be a standard SAE 5W-30 hydrocarbon motor oil formulation having the composition shown below in Table 5.

TABLE 5

| | W % |
|---|---|
| Base Oil | 86 |
| Viscosity Index Improver (product of the invention) | 5 |
| Standard Additive Package: | 9 |
| Polyisobutenyl ($M_n$ 1290) succinimide (dispersant); | |
| calcium sulfonate (detergent); | |
| Zinc dithiophosphate (anti-wear); | |
| di-nonyl diphenyl amine (anti-oxidant); | |
| 4,4'-methylene-bis (2,6-di-t-butyl phenol) (antioxidant); | |

Use of the additive of this invention makes it possible to readily increase the viscosity index by 25-40 units, say 35 units and to obtain improved ratings on the tests measuring the dispersancy of the system. The viscosity index is determined by ASTM Test D-445.

Practice of the process of this invention will be apparent to those skilled in the art from the following examples wherein, as elsewhere in this specification, all parts are parts by weight unless otherwise set forth. Control examples are designated by an asterisk.

DESCRIPTION OF THE PREFERRED EMBODIMENTS

Example 1

In this example which describes the best mode presently known of carrying out the first step, there is charged to a reaction vessel, under nitrogen, 11.08 g maleic anhydride first monomer, 161.92 g lauryl methacrylate second monomer, 79.75 g of stearyl methacrylate auxiliary second monomer, 0.25 g of lauryl mercaptan chain transfer agent, and 45.55 g of mineral oil as a polymerization solvent.

The reaction mixture is heated to 83° C. with agitation under nitrogen; and 0.40 g of azobisisobutyronitrile (AIBN) polymerization initiator is added. The reaction mixture is stirred for 3 hours, followed by addition of 0.09 g of azobisisobutyronitrile and 199.3 g of 100E Pale Oil. Heating at 83° C. is continued for 1.5 hour and then the temperature is raised to 100° C. for an additional hour. The reaction mixture is then cooled to room temperature.

Example 2

The reaction conditions are the same as in Example 1. Charge included 14.85 g of maleic anhydride, 159.39 g of lauryl methacrylate, and 78.51 g of stearyl methacrylate. All other reagent quantities are the same as in Example 1.

Example 3

Reaction conditions are the same as in Example 1. Charge includes 16.63 g of maleic anhydride, 158.20 g of lauryl methacrylate, and 83.47 g of stearyl methacrylate. All other reagent quantities are the same as in Example 1.

Example 4

Reaction conditions are the same as in Example 1. Charge includes 16.63 g of maleic anhydride, 158.20 g of lauryl methacrylate, and 77.92 g of stearyl methacrylate. All other reagent quantities are the same as in Example 1.

Example 5

In this example there is added to the product of Example 1 in the same reaction vessel 45.02 g of phenothiazine and 19.33 g of undecylamine. The reaction temperature is raised to 160C. and maintained for 5 hours. The reaction mixture is then cooled to room temperature.

Example 6

In this example, there is added to the product of Example 1 in the same reaction vessel a 22.61 g of N-methylpiperazine. The reaction conditions are the same as in Example 5.

Example 7

In this example there is added to the product of Example 3 in the same reaction vessel a mixture of 22.5 g phenothiazine and 19.33 g of N-methylpiperazine. The reaction conditions are the same as in Example 5.

Example 8

In this example there is added to the product of Example 1 in the same reaction vessel a mixture of 22.50 g of phenothiazine and 11.54 g of 3(N,N-dimethylamino) propylamine. The reaction conditions are the same as in Example 5.

Example 9

In this example there is added to the product of Example 2 in the same reaction vessel a mixture of 30.15 g of phenothiazine and 14.85 g of 3(N,N-dimethylamino)-propylamine. The reaction conditions are the same as in Example 5.

Example 10

In this example there is added to the product of Example 4 in the same reaction vessel a mixture of 33.7 g of phenothiazine and 16.63 g of 3(N,N-dimethylamino)-propylamine. The reaction conditions are the same as in Example 5.

Examples 11-18

In these Examples, a Base Blend is employed as follows:

| Composition | Wt. % |
|---|---|
| Solvent Neutral Oil 130 | 75.25 |
| Solvent Neutral Oil 335 | 21.74 |
| Zinc Dithiophosphate | 1.12 |
| Dinonyldiphenylamine | 0.39 |
| Magnesium Sulfonate | 1.50 |
| Poly(siloxane) | 150 ppm |
| ANALYSES | |
| Kinematic Viscosity, cst, 40 C. | 31.50 |
| 100 C. | 5.36 |
| Pour Point, F D-97 | +5 |
| Ash, Sulfated % D-874 | 0.93 |
| Phosphorus, % X-Ray | 0.11 |
| Sulfur, % X-Ray Total | 0.40 |
| Zinc, % X-Ray | 0.12 |
| Magnesium, % | 0.33 |
| Cold Cranking Simulator, cP, −18 C. | 1660 |

The compositions of this invention of Examples 1, 4-10 were blended at a 4.85 wt.% polymer level in the above Base Blend; and the resultant composition was tested for Dispersancy by the Bench VC Test. In this test, the dispersancy is measured against three standards (excellent/good/poor) and improved dispersancy is evidenced by the lower ratings provided below in Table 6.

TABLE 6

| Example | Polymer of Example | BVCT Result | Standards |
|---------|--------------------|-----------  |-----------|
| 11*     | 1                  | 98.5        | 8/29/68   |
| 12*     | 4                  | 98.6        | 8/29/68   |
| 13      | 5                  | 98.0        | 9/25/56   |
| 14      | 6                  | 11.4        | 10/20/55  |
| 15      | 7                  | 28.4        | 9/25/56   |
| 16      | 8                  | 29.0        | 6 34/61   |
| 17      | 9                  | 24.5        | 7/20/53   |
| 18      | 10                 | 24.2        | 7/20/53   |

From the above, it will be apparent to those skilled in the art that the product of Examples 11* and 12* (which were not functionalized at all) and product of Example 13 (which was functionalized with phenothiazine) are not characterized by the desired degree of dispersancy.

Examples 14–18 which, in accordance with this invention, contain polymer which is functionalized phenothiazine and amine, are characterized by desired degree of dispersancy.

In a further series of tests, the compositions of Examples 1, 5, 8 and 10 were blended at 0.75 w % polymer concentration in SNO-130 oil and evaluated in the Bench Oxidation Test. In this test, a solution containing 1.5 wt.% of test polymer in SNO-130 oil is blown with air while heated and stirred. Samples are withdrawn periodically for analysis by Differencial Infrared Absorption (DIR) to observe changes in the carbonyl vibration band at 1710 $CM^{-1}$. Higher carbonyl vibrational band intensity indicates a lower thermal-oxidative stability of the sample as shown below in Table 7.

TABLE 7

| Example | Polymer of Example | Oxidation Index @ 144 hours |
|---------|--------------------|-----------------------------|
| 19*     | 1                  | 17.4                        |
| 20      | 5                  | 2.2                         |
| 21      | 7                  | 1.7                         |
| 22      | 8                  | 2.2                         |
| 23      | 10                 | 2.9                         |

From the above, it will be apparent to those skilled in the art that the composition of Example 19* fails to exhibit anti-oxidation ability. Note that the compositions of Examples 20–23 of the instant invention exhibit antioxidant characteristics.

In a further series of tests, the Thickening Effect is measured.

The compositions of Examples 5–10 are blended at 5 w % polymer composition in SNO-100 and the kinematic viscosity at 100° C. is measured as shown below in Table 8.

TABLE 8

| Example | Polymer of Example | Kinematic Viscosity cst @ 100° C. | Thickening Effect CST |
|---------|--------------------|-----------------------------------|-----------------------|
| 24      | 5                  | 13.00                             | 4.87                  |
| 25      | 6                  | 11.74                             | 3.61                  |

TABLE 8-continued

| Example | Polymer of Example | Kinematic Viscosity cst @ 100° C. | Thickening Effect CST |
|---------|--------------------|-----------------------------------|-----------------------|
| 26      | 7                  | 11.75                             | 3.60                  |
| 27      | 8                  | 13.16                             | 5.03                  |
| 28      | 9                  | 12.70                             | 4.57                  |
| 29      | 10                 | 12.93                             | 4.80                  |

From the above Table, it is apparent that the products formulated with the additives of this invention provide increased thickening effect.

Although this invention has been illustrated by reference to specific embodiments, it will be apparent to those skilled in the art that various changes and modifications may be made which clearly fall within the scope of this invention.

We claim:

1. An antioxidant/dispersant lubricating oil composition comprising a major portion of a lubricating oil and a minor effective viscosity index improving portion of, as additive, a functionalized polymer comprising moieties derived from (i) first monomer containing a copolymerizable ethylenically unsaturated carbon-carbon double bond and a dicarboxylic acid anhydride moiety and (ii) second monomer which is an acrylate or a methacrylate the polymer backbone bearing at least two pendant side chains containing dicarboxylic acid anhydride moieties, having been functionalized with first functionalizing agent phenothiazine, and a second portion of said side chains containing anhydride moieties having been functionalized with, as second functionalizing agent, a primary or secondary heterocyclic amine.

2. The lubricating oil composition of claim 1, wherein said functionalized polymer has a molecular weight $\overline{M}_n$ ranging from about 10,000 to about 1,000,000.

3. The lubricating oil composition of claim 1, wherein said first monomer is maleic anhydride

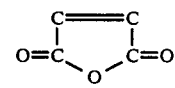

4. The lubricating oil composition of claim 1, wherein said first monomer is citraconic anhydride or itaconic anhydride.

5. The lubricating oil composition of claim 1, wherein said primary or secondary heterocyclic amine is selected from the group consisting of morphaline, N-amino-propylmorpholine, 2, 6 -dimethlmorpholine, N-methylpiperazine, 3-amino-pyrazale, aminopyrazine, 1-(3-aminopropyl)2-pipecoline, 1-(-3-aminopropyl)-2-pyrrolidinone, 2-aminopyrimidine and 4-aminopyrimidine.

6. The lubricating oil composition of claim 1, wherein said second functionalizing agent is N-methyl piperazine.

7. The lubricating oil composition of claim 1, wherein said viscosity index improving portion is 0.2–15.0 wt.%.

8. A lubricating oil composition comprising a major portion of a lubrication oil and 0.2–15.0 wt.% of a functionalized polymer containing moieties derived from maleic anhydride and lauryl methacrylate and stearyl methacrylate, said polymer having been functionalized with phenothiazine and N-methyl piperazine.

* * * * *